Aug. 22, 1961
G. H. LOHRER
2,997,580
SQUELCH SYSTEM
Filed March 13, 1956
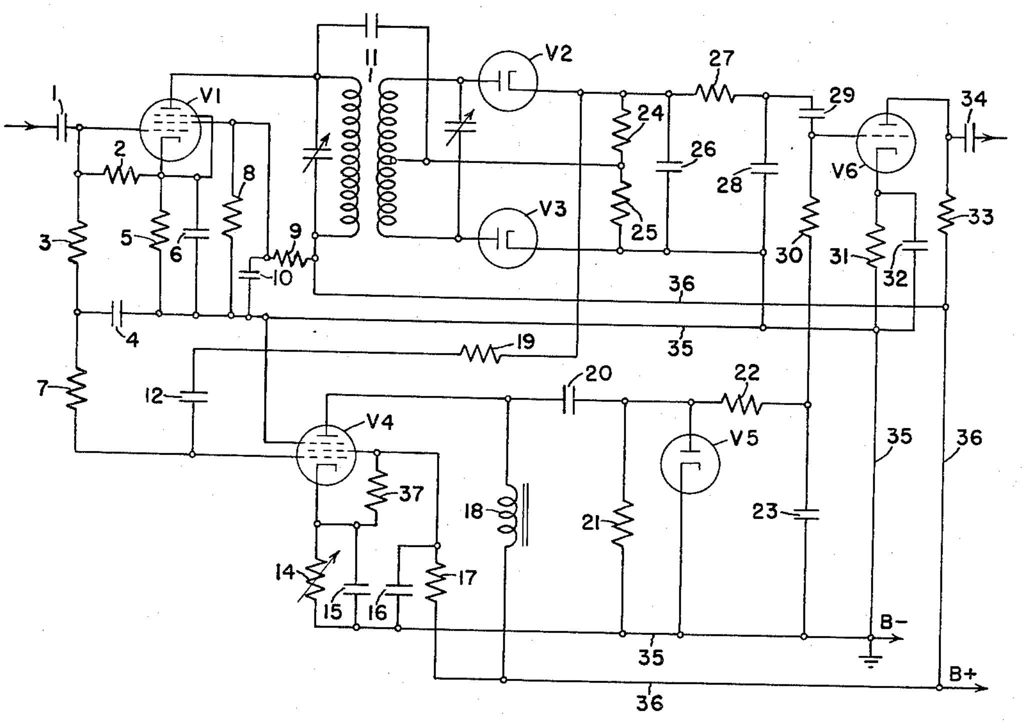
INVENTOR:
GEORGE H. LOHRER,
BY Julius J. Zaskalicky
HIS ATTORNEY.

United States Patent Office 2,997,580

Patented Aug. 22, 1961

2,997,580

SQUELCH SYSTEM

George Herman Lohrer, Toronto, Ontario, Canada, assignor to Canadian General Electric Company, Limited, Toronto, Ontario, Canada, a corporation of Canada Filed Mar. 13, 1956, Ser. No. 571,330

7 Claims. (Cl. 250—20)

This invention relates to radio receiving systems, and more particularly to an improved squelch circuit for muting the output of a frequency-modulation radio receiver when no useful signal energy is received.

It is well known in the art that when a radio receiver is in operating condition and no signal is received, noise voltages due to thermal agitation potentials and atmospheric disturbances are amplified in the radio-frequency stages of the receiver, detected and reproduced as sound in the output. The noise reproduced is very annoying to listeners and it is common practice to employ some form of squelch circuit to mute the output of the receiver when no carrier is received or when the signal is of such a low value as to be unintelligible. The noise voltages are utilized to operate the muting system in absence of a received carrier.

It is desirable that a very abrupt transition be made from the muted to the signal-reproducing condition of the receiver in response to a received carrier. In order to effect this abrupt transition, it is desirable to provide for a high rate of change of a control voltage with respect to the changes in amplitude of a received carrier.

It is, therefore, an object of the present invention to provide in a radio receiver a muting system which effects a rapid transition from the muting to the signal-reproducing condition of the receiver.

It is a still further object of the present invention to provide an economical squelch system for a radio receiver having the desirable features incorporated therein.

Briefly, in accordance with the invention, there is provided a noise muting system for an angle-modulation receiver having at least a limiter stage, an angle-modulation detector stage and a modulation signal amplifier. The system comprises squelch circuit means for producing a control voltage which is applied to the modulation signal amplifier for controlling the gain thereof, means for applying limiter-produced voltage to the squelch circuit means to control its operation, and circuit means for substantially neutralizing the limiter-produced voltage as it appears at the squelch circuit means, in the absence of a carrier signal at the limiter stage.

In accordance with a specific embodiment of the invention, noise voltages appearing in the modulation-output circuit of a frequency discriminator of a radio receiver are selectively amplified and detected to produce a direct-current control voltage which is effective to mute the audio stages of the receiver in the absence of a received carrier. The selective noise amplifier is controlled to operative and inoperative conditions by a novel method of biasing employing the grid voltage of the limiter stage in the receiver located ahead of the discriminator circuit. Although the means used for obtaining the bias is novel, the normal operation of the limiter stage is unaffected. In accordance with the invention, the limiter stage of the receiver includes a cathode resistor of relatively high value. The grid leak resistor is returned directly to the cathode of the limiter and hence the cathode resistor has no effect on limiter action. Due to the fact that the limiter grid leak resistor is tied directly to the cathode of that stage, the potential of the grid of the limiter with respect to ground may be adjusted to be substantially zero in the absence of a received carrier by appropriate choice of cathode resistor value. It is to be understood that in the absence of a received carrier the noise voltages in a frequency-modulation receiver normally produce a substantial negative bias at the limiter grid with respect to the limiter cathode; the limiter cathode resistor is selected to produce a positive cathode voltage with respect to ground, which substantially equals the negative grid bias. The cathode voltage neutralizes the grid bias; the grid potential with respect to ground is substantially zero.

The adjustment of the limiter grid voltage to zero with respect to ground, this voltage being used as grid control voltage for the noise amplifier, which provides maximum amplification of noise voltage in the absence of a received carrier. The full voltage change on the limiter grid, when a carrier is received, is applied to the noise amplifier grid to effect rapid reduction of the gain thereof and thus rapid transition of the receiver from muted to signal reproducing condition.

The invention will now be described with reference to the single figure of the drawing showing a preferred embodiment thereof.

For the sake of simplicity, the radio-frequency stages prior to the limiter circuit and the final audio amplifiers of the receiver have been omitted. The intermediate radio-frequency voltage from the prior stages of the receiver is applied through coupling capacitor 1 to the control grid of a limiter stage $V_1$. The grid of $V_1$ is tied to the cathode thereof by means of a resistor 2. Capacitor 1 and resistor 2 form the well-known limiter grid leak biasing system. The cathode of $V_1$ is connected to ground by means of a resistor 5 bypassed by capacitor 6. The suppressor grid of $V_1$ is connected directly to the cathode. The screen grid voltage supply circuit comprises serially-connected resistors 8, 9 and decoupling capacitor 10. The plate is connected to B+ through the primary of a discriminator transformer 11.

The output of the limiter stage is fed to the primary of a discriminator transformer 11. The secondary of the discriminator transformer 11 has connected thereacross two diodes $V_2$, $V_3$ and associated load resistors 24, 25, and capacitor 26 to form the well-known frequency-modulation detection circuit. It is, of course, understood that other well-known forms of angle-modulation detectors may be employed and that the invention is concerned with all types of angle modulation.

The modulation output voltage is coupled through a deemphasis network comprising resistor 27 and capacitor 28, and a coupling capacitor 29 to the grid of a modulation signal amplifier $V_6$. The output of amplifier $V_6$ is developed across a resistance 33 and applied to further stages through coupling condenser 34. The cathode of $V_6$ is returned to ground through a parallel biasing circuit comprising a resistor 31 and a capacitor 32. The grid of $V_6$ is connected to ground by means of series resistors 30, 22 and 21. The necessary direct-current potential is supplied to the receiver circuit as shown at B+ and B−. Filament circuits have been omitted for simplicity reasons.

The modulation signal output developed across resistors 24 and 25 is also coupled by an isolating resistor 19 and a coupling capacitor 12 to the control grid of a noise amplifier $V_4$. The control grid of $V_4$ is connected by series resistors 3 and 7 to the control grid of $V_1$. Capacitor 4 bypasses to ground the junction of resistors 3 and 7 and thereby prevents signal interaction between stages $V_1$ and $V_4$. Capacitor 12, in conjunction with resistors 7 and capacitor 4, acts as a high pass filter for modulation signals and passes only those frequencies above the desired audio or modulation signal band.

The cathode of noise amplifier $V_4$ is connected to ground by means of a parallel circuit comprising variable resistor 14 and capacitor 15. $V_4$ is shown here as a pentode having its screen tied to B+ through resistor 17. The screen is further connected to cathode resistor 14 by a resistor 37. A decoupling capacitor 16 is connected between the screen of $V_4$ and ground. It will be seen that an adjustable positive bias is applied to the cathode of $V_4$ by means of resistors 17, 37 and 14 which form the well-known bleeder-type circuit.

The anode load of $V_4$ comprises an inductance 18, preferably tuned to a frequency lying within the noise-frequency band as amplified by $V_4$. The output of $V_4$ is applied by a coupling capacitor 20 to a diode $V_5$ which may be of the vacuum or other suitable unidirectional conducting type.

The noise voltages applied to diode $V_5$ are rectified thereby to produce a negative control voltage across resistor 21 which is applied through series-connected resistors 22 and 30 to the control grid of amplifier $V_6$. Capacitor 23, in conjunction with resistors 22 and 30, acts to isolate the rectifier and amplifier insofar as noise and signal voltages are concerned.

In the operation of the circuit described and in the absence of a received-signal carrier, cathode resistor 5 of limiter $V_1$ is chosen of such a value as to produce a positive potential at the cathode of $V_1$ which is preferably equal to the negative voltages produced at the grid thereof due to noise voltages amplified through the preceding radio-frequency stages. Resistor 5 may be made variable for ease of adjustment. Thus it will be seen that the voltage at the grid of noise amplifier $V_4$ will be approximately zero with respect to ground, due to the fact that the grid and cathode voltages of $V_1$ are series opposing, hence maximum gain will be achieved by noise amplifier $V_4$.

The noise-signal voltages amplified by $V_1$ are detected in the frequency-modulation detector to produce noise-modulation voltages which are applied to the grid of $V_4$. The detected noise voltages are amplified thereby and rectified by $V_5$ to produce a negative voltage which is applied to the grid of modulation-signal amplifier $V_6$.

Variable resistor 14, commonly known as the squelch control, is adjusted to control the amplification of $V_4$ to the point where, in the absence of a received-signal carrier, the bias produced by rectifier $V_5$ is just sufficient to cut off modulation-signal amplifier $V_6$.

If a signal carrier is now received, the increase in the bias on limiter $V_1$ is applied in full to noise emplifier $V_4$. If, as has been done in the past, the limiter voltage is not neutralized by the incorporation of cathode resistor 5, then a bleeder network would be used to reduce the bias on noise amplifier $V_4$ in the absence of a received carrier. When the bleeder system is used, the limiter bias change applied to the noise amplifier is reduced and varies in proportion thereto and the change may be small, depending on the bleeder network component values.

The invention enables the application of the limiter grid voltage change in full to the noise amplifier to provide a large change in gain thereof. Insofar as the voltage change at the grid of the noise amplifier is concerned, when using the invention, the rate of change is great since the bias changes from substantially zero to some negative value on the reception of a signal carrier.

In a specific embodiment of applicant's system, under the "no carrier" condition, the negative voltage across grid resistor 2 due to the noise signals is about minus fifteen volts. This voltage is neutralized by a corresponding positive voltage across cathode resistor 5. Therefore, the voltage from the grids $V_1$ and $V_4$ to ground is zero. The bias on $V_4$ is substantially zero for all positions (values) of resistor 14 since the voltage across resistor 14 is relatively small (about one volt) in this type of circuit. (When resistor 14 is set to zero resistance, the bias is actually zero.) When a carrier is received, the average voltage across the grid resistor 2 drops to about minus twenty volts and there is an abrupt five volt increase in the bias of $V_4$. If the bias of $V_4$ were zero (resistor 14 set to zero resistance), the percentage change would be infinite. However, if, as is the usual case, the bias is about one volt, the change in bias is many hundreds of percent.

It will, therefore, be seen that the invention comprises a muting system which provides for very rapid transition from the muted to the signal-reproducing condition of a receiver. The system provides for the reception of very weak signals which is desirable, especially for high-frequency mobile communication systems.

Although a specific embodiment has been disclosed and described for the purpose of explaining the features and principles of the invention, it is to be understood that this invention is not limited thereto but is capable of modification. For example, the bias voltage for the noise amplifier may be obtained from an earlier limiter stage. Diodes $V_2$, $V_3$ and $V_5$ may be of any suitable unidirectional conducting device. Triodes may be substituted for pentodes and vice-versa or other suitable tubes may be substituted therefor.

What is claimed is:

1. In an angle-modulation radio receiver including a limiter stage having a cathode and a control grid, an angle-modulation detector and a modulation signal amplifier, selective amplifier and rectifier means for producing a direct-current voltage proportional to the noise output of said detector in the absence of a received carrier comprising a vacuum tube amplifier having an input circuit and an output circuit, selective means for supplying noise voltages derived from said detector to said input circuit, said rectifier means being connected across said output circuit for producing said direct current voltage, means for applying said direct-current voltage to said modulation signal amplifier to control the gain thereof, means for applying the limiter stage control grid voltage to said selective amplifier to control the gain thereof, and means for neutralizing said limiter control grid voltage, as applied to said selective amplifier in the absence of a received carrier comprising resistance means connecting said control grid to said cathode and further resistance means connecting said cathode to a source of zero potential.

2. A noise muting system for an angle-modulation receiver having at least a limiter stage, an angle-modulation detector stage and a modulation signal amplifier comprising noise amplifier means adapted to selectively amplifiy noise signals produced by said detector which lie outside of a desired modulation signal frequency range, rectifier means adapted to rectify the noise voltages amplified by the said noise amplifier to produce a control voltage which is applied to said modulation signal amplifier to control the gain thereof, means for applying limiter-produced voltage to said noise amplifier means to control the gain thereof and circuit means for substantially neutralizing said limiter produced voltage as it appears at said noise amplifier means, in the absence of a carrier signal at said limiter stage.

3. In an angle-modulated carrier receiver comprising a modulated carrier limiter stage including a grid-controlled vacuum tube amplifier wherein a potential is produced on the limiter grid proportional to any signal limited thereby, an angle-modulation signal detector circuit and a modulation signal amplifier, a noise amplifier, means associated with said angle-modulated carrier receiver for selecting noise signals outside of a desired modulation frequency range and applying them to said noise amplifier, rectifier means coupled to said noise amplifier and adapted to produce a control voltage proportional to said noise signals, means for applying said control voltage to said modulation-signal amplifier to control the gain thereof, means for applying said potential to said noise amplifier to control the gain thereof, and cathode resistance means in said limiter adapted to substantially neutralize said potential, as applied to the noise amplifier, in the absence of a received signal.

4. A muting system for an angle-modulation receiver comprising a source of frequency-modulated carrier, a vacuum tube amplifier limiting means having at least a cathode, anode and control grid, power supply means for said amplifier limiting means having a common terminal and a terminal positive with respect to said common terminal, a capacitor coupling said carrier source to said control grid, resistor means connecting said control grid to said cathode to provide a grid leak source effective to provide a negative voltage at said grid on the application of noise or carrier to said capacitor, resistance means connecting said cathode to said common terminal and of a value such that during periods when no carrier signal is received the voltage at the grid of said amplifier limiting means is substantially zero with respect to said common terminal, selective noise amplifier means adapted to accept and amplify signals of frequencies outside a desired frequency range to produce a control voltage in the absence of a received carrier to mute said modulation amplifier, and signal decoupling means adapted to apply the voltage produced at the grid of said amplifier limiting means to said noise amplifier to control the gain thereof.

5. An angle-modulation receiving system comprising an angle-modulated receiver having a limiter stage, said limiter stage comprising a signal control device having an input electrode and a reference electrode, a source of reference potential, first resistance means coupled between said input electrode and said reference electrode, second resistance means coupled between said reference electrode and said source of reference potential, said first and second resistance means each having a resistance chosen so that the voltage drop across said first resistance means is substantially equal to the voltage drop across said second resistance means in the absence of a received carrier signal and in the presence of a received carrier signal the voltage drop across said first resistance means is greater than the voltage drop across said second resistance means, noise amplifier means responsive to noise signals sensed by said angle-modulation receiver for producing a control voltage to control the gain of said angle-modulation receiver, and coupling means for coupling the input electrode of said limiter stage to said noise amplifier means to control the gain of said noise amplifier means.

6. A noise muting system for an angle-modulation receiver having at least a limiter stage, an angle-modulation detector stage and a modulation signal amplifier comprising squelch circuit means for producing a control voltage which is applied to said modulation signal amplifier for controlling the gain thereof, means for applying limiter-produced voltage to said squelch circuit means to control the operation thereof and circuit means for substantially neutralizing said limiter-produced voltage as it appears at said squelch circuit means, in the absence of a carrier signal at said limiter stage.

7. A noise muting system for an angle-modulation receiver having at least a limiter stage, an angle-modulation detector stage and a modulation signal amplifier comprising squelch circuit means having noise amplifier means adapted to selectively amplify noise signals produced by said detector stage which lie outside of a desired modulation signal frequency range, rectifier means adapted to rectify the noise signals amplified by the said noise amplifier means to produce a control voltage which is applied to said modulation signal amplifier to control the gain thereof, means for applying limiter-produced voltage to said squelch circuit means to control the operation thereof and circuit means for substantially neutralizing said limiter produced voltage, as it appears at said squelch circuit means, in the absence of a carrier signal at said limiter stage.

References Cited in the file of this patent

UNITED STATES PATENTS

| | | |
|---|---|---|
| 2,400,948 | Peterson | May 28, 1946 |
| 2,404,338 | Worcester | July 16, 1946 |
| 2,527,617 | Berger | Oct. 31, 1950 |
| 2,652,488 | Smeltzer et al. | Sept. 15, 1953 |
| 2,751,493 | Hargrove | June 19, 1956 |
| 2,756,328 | Braak | July 24, 1956 |